(12) United States Patent
Goto et al.

(10) Patent No.: US 7,001,929 B2
(45) Date of Patent: Feb. 21, 2006

(54) PROTON CONDUCTIVE MEMBRANE HAVING IMPROVED THERMAL STABILITY

(75) Inventors: Kohei Goto, Tokyo (JP); Mayumi Kakuta, Tokyo (JP); Fusazumi Masaka, Tokyo (JP); Kiyonori Kita, Tokyo (JP); Naoki Mitsuta, Wako (JP); Masaru Iguchi, Wako (JP); Hiroshi Soma, Wako (JP); Nagayuki Kanaoka, Wako (JP)

(73) Assignees: JSR Corporation, Tokyo (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/641,212

(22) Filed: Aug. 15, 2003

(65) Prior Publication Data

US 2004/0151984 A1    Aug. 5, 2004

(30) Foreign Application Priority Data

Aug. 20, 2002 (JP) .............................. 2002-239446

(51) Int. Cl.
    *C08J 5/20* (2006.01)
(52) U.S. Cl. ............................. 521/27; 521/30; 521/31; 429/33; 429/42
(58) Field of Classification Search ................. 521/27, 521/30, 31; 429/33, 42
See application file for complete search history.

(56) References Cited

U.S. PATENT DOCUMENTS

| 2002/0155340 A1 * | 10/2002 | Nanaumi et al. .............. 429/40 |
| 2002/0164513 A1 * | 11/2002 | Asano et al. ................. 429/32 |
| 2002/0172850 A1 * | 11/2002 | Asano et al. ................. 429/33 |
| 2003/0173547 A1 * | 9/2003 | Yamakawa et al. ......... 252/500 |
| 2003/0219532 A1 * | 11/2003 | Kanaoka et al. ............ 427/115 |
| 2004/0121211 A1 * | 6/2004 | Asano et al. ................. 429/33 |

\* cited by examiner

*Primary Examiner*—Bernard Lipman
(74) *Attorney, Agent, or Firm*—Arent Fox PLLC

(57) ABSTRACT

The invention provides a proton conductive membrane excellent in heat resistance, which has sulfonic acid as ion exchange groups. The proton conductive membrane comprises a nitrogen-containing compound that can be mixed with water in arbitrary proportions and has a boiling point of not lower than 100. degree. C. and a proton conductive resin which has sulfonic acid ion-exchange groups, wherein the nitrogen-containing compound is contained in an amount of 0.5 to 10 parts by weight based on 100 parts by weight of the proton conductive resin.

4 Claims, No Drawings

PROTON CONDUCTIVE MEMBRANE HAVING IMPROVED THERMAL STABILITY

FIELD OF THE INVENTION

The present invention relates to a proton conductive membrane having improved thermal stability.

BACKGROUND OF THE INVENTION

Solid materials through which ions can migrate have been vigorously studied for use as conducting materials in electrochemical elements such as battery cells. Those ion conductors have so far been found for $Li^+$, $Ag^+$, $H^+$, $F^-$ and other ion species. Particularly, proton ($H^+$) conductors are expected for application in various electrochemical elements such as fuel cells, capacitors and electrochromic display elements, and can be used as an electrolyte in those electrochemical elements.

The proton conductors are required to exhibit a high proton conductivity at around room temperature. Known proton conductors include inorganic substances such as uranyl phosphate hydrate and molybdophosphoric acid hydrate, and organic substances such as ion-exchange polymer membranes which comprise a perfluoroalkane-based polymer having side chains containing a perfluorosulfonic group.

As the organic proton conductors, proton conductive membranes having sulfonic acid as ion exchange groups are well known. However, such organic proton conductors can be used only within a limited temperature range owning to a reversible elimination reaction of the sulfonic groups and a crosslinking reaction associated with the sulfonic acid. This has set an upper limit on the service temperatures of these conductors, and the conductors have accordingly been limited in their heat resistance applicable to fuel cells.

SUMMARY OF THE INVENTION

In view of the above prior art, it is an object of the present invention to provide a proton conductive membrane having sulfonic acid as ion exchange groups, which is excellent in heat resistance. The invention provides the following proton conductive membranes to achieve the above object.

(1) A proton conductive membrane comprising a nitrogen-containing compound which can be mixed with water in arbitrary proportions and has a boiling point of not lower than 100° C and a proton conductive resin which has sulfonic acid as ion exchange groups, wherein the nitrogen-containing compound is contained in an amount of 0.5 to 10 parts by weight based on 100 parts by weight of the proton conductive resin.

(2) The proton conductive membrane as described in (1), wherein the proton conductive resin having sulfonic acid ion-exchange groups is a sulfonated polyarylene.

(3) The proton conductive membrane as described in (1) or (2), wherein the nitrogen-containing compound is compatibilized with the proton conductive resin.

(4) The proton conductive membrane as described in (1) or (2), wherein the nitrogen-containing compound is N-methylpyrrolidone, tetramethylurea or dimethylimidazolidinone.

DESCRIPTION OF THE PREFERRED EMBODIMENTS

The proton conductive membrane according to the present invention will be described in detail hereinafter.

The proton conductive membrane comprises a nitrogen-containing compound and a proton conductive resin having sulfonic acid ion-exchange groups.

(Nitrogen-Containing Compound)

The nitrogen-containing compound suitable for use in the invention can be mixed with water and should have a boiling point of not lower than 100° C. This compound is preferably liquid at room temperature.

When the nitrogen-containing compound is a compound miscible with water in arbitrary proportions, the preparation of the proton conductive membrane can be facilitated. Further, with the boiling point of not lower than 100° C., the nitrogen-containing compound may not be seriously lost during the producing process according to the method described hereinafter so that the resulting proton conductive membrane will contain it in a sufficient quantity.

The nitrogen-containing compound preferably has a basicity enough for the ionic interaction with the sulfonic acid.

Examples of the nitrogen-containing compound include piperidine (boiling point: 106.4° C.), pyridine (115.3° C.), morpholine (128.9° C.), cyclohexylamine (134.8° C.), N,N-dimethylformamide (153° C.), N,N-dimethylacetamide (166° C.), aminoethanol (171.0° C.), N-methylformamide (180° C.), N-methylpyrrolidone (202° C.), N-methylacetamide (206° C.), formamide (210.5° C.), acetamide (221.2° C.), diethanolamine (268° C.), tetramethylurea (177.5° C.) and dimethylimidazolidinone (255.5° C.). Of these, N-methylpyrrolidone is preferable in view of basicity and stability thereof and since it is a good solvent for sulfonated polyarylenes.

When the proton conductive membrane having sulfonic acid ion-exchange groups contains the above nitrogen-containing compound, the elimination of the sulfonic group and the crosslinking reactivity associated with the sulfonic groups may be suppressed.

(Proton Conductive Resin having Sulfonic Acid Ion-Exchange Groups)

Examples of the proton conductive resin having sulfonic acid ion-exchange groups include sulfonated polymers of polyarylene, polyimide, polyetherketone, polyether ether ketone, polyethersulfone, polyether sulfone ketone, polybenzimidazole and polyquinoline. Of these, sulfonated polyarylene is preferred.

The sulfonated polyarylene is prepared by sulfonating a polyarylene resulting from the reaction of a monomer (A) of the following formula (A) with at least one monomer (B) selected from the following monomers (B-1) to (B-4).

(A)

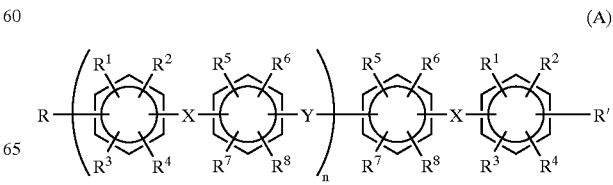

-continued

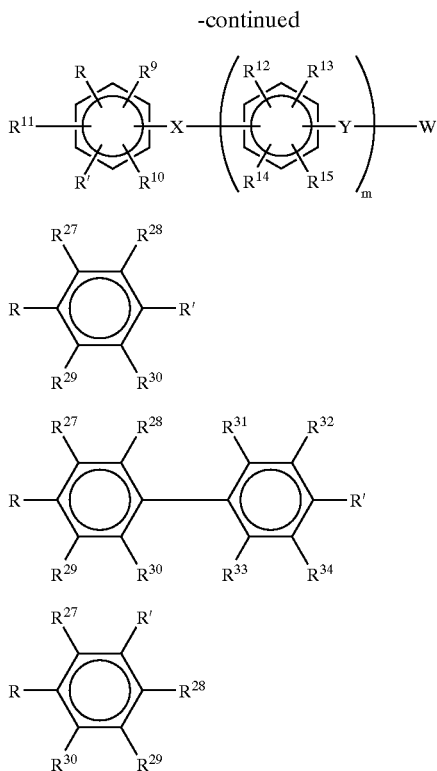

(B-1)

(B-2)

(B-3)

(B-4)

In the formula (A), R and R', which may be the same or different, are independently a halogen atom other than a fluorine atom or a —OSO$_2$Z group (Z is an alkyl group, a fluorine-substituted alkyl group or an aryl group).

Exemplary alkyl groups indicated by Z include methyl and ethyl; exemplary fluorine-substituted alkyl groups include trifluoromethyl; and exemplary aryl groups include phenyl and p-tolyl.

$R^1$ to $R^8$, which may be the same or different, are independently at least one atom or group selected from the group consisting of a hydrogen atom, a fluorine atom, and alkyl, fluorine-substituted alkyl, allyl and aryl groups.

Examples of the alkyl groups include methyl, ethyl, propyl, butyl, amyl and hexyl. Of these, methyl, ethyl, etc. are preferred.

Examples of the fluorine-substituted alkyl groups include trifluoromethyl, perfluoroethyl, perfluoropropyl, perfluorobutyl, perfluoropentyl and perfluorohexyl. Of these, trifluoromethyl, pentafluoroethyl, etc. are preferred.

Examples of the allyl groups include propenyl.

Examples of the aryl groups include phenyl and pentafluorophenyl.

X is a divalent electron attracting group, and examples thereof include —CO—, —CONH—, —(CF$_2$)$_p$— (wherein p is an integer of 1 to 10), —C(CF$_3$)$_2$—, —COO—, —SO—, —SO$_2$— and the like.

The electron attracting group is defined as a group with a Hammett substituent constant of not less than 0.06 at the m-position of a phenyl group and not less than 0.01 at the p-position.

Y is a divalent electron donating group, and examples thereof include —O—, —S—, —CH=CH—, —C≡C— and groups represented by the following formulae:

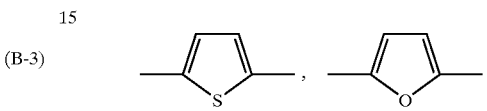

wherein n is 0 or a positive integer of up to 100, preferably up to 80.

Examples of the monomer of the formula (A) include 4,4'-dichlorobenzophenone, 4,4'-dichlorobenzanilide, bis(chlorophenyl)difluoromethane, 2,2-bis(4-chlorophenyl)hexafluoropropane, 4-chlorobenzoic acid-4-chlorophenyl, bis(4-chlorophenyl)sulfoxide, bis(4-chlorophenyl)sulfone, corresponding compounds to the above compounds except that the chlorine atom is replaced with a bromine or an iodine atom, and corresponding compounds to the above compounds except that the halogen substitution occurs at the 3-position in place of at the 4-position.

Examples of the monomer of the formula (A) further include 4,4'-bis(4-chlorobenzoyl)diphenyl ether, 4,4'-bis(4-chlorobenzoylamino)diphenyl ether, 4,4'-bis(4-chlorophenylsulfonyl)diphenyl ether, 4,4'-bis(4-chlorophenyl)diphenyl ether dicarboxylate, 4,4'-bis((4-chlorophenyl)-1,1,1,3,3,3-hexafluoropropyl) diphenyl ether, 4,4'-bis((4-chlorophenyl)tetrafluoroethyl)diphenyl ether, corresponding compounds to the above compounds except that the chlorine atom is replaced with a bromine or an iodine atom, corresponding compounds to the above compounds except that the halogen substitution occurs at the 3-position in place of at the 4-position, and corresponding compounds to the above compounds except that at least one of the substituent groups at the 4-position of diphenyl ether is altered to the substituent at the 3-position.

Also available as the monomers of the formula (A) are 2,2-bis(4-(4-(4-chlorobenzoyl)phenoxy)phenyl)-1,1,1,3,3,3-hexafluoropropane, bis(4-(4-(4-chlorobenzoyl) phenoxy) phenyl)sulfone, and compounds represented by the following formulae:

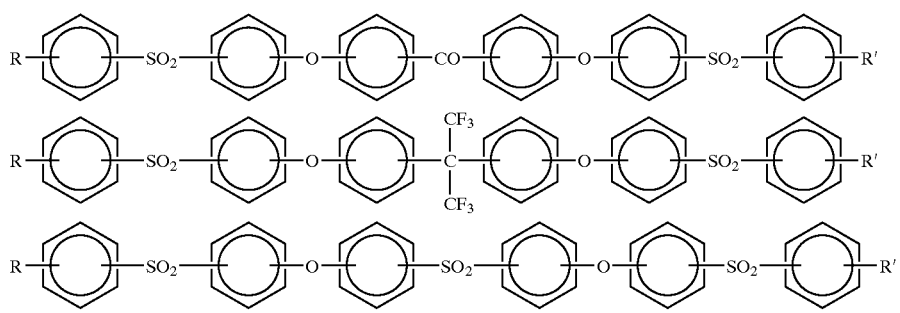

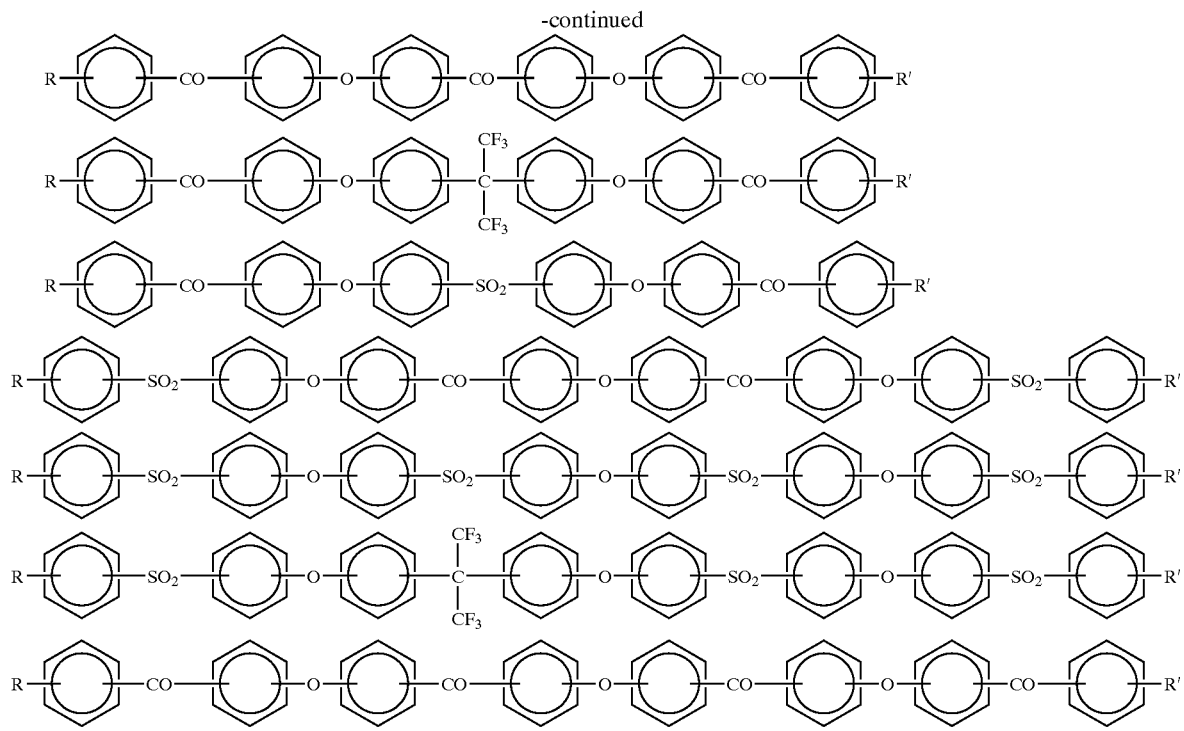

For example, the monomer (A) may be synthesized by the following process.

First, an alkali metal such as lithium, sodium or potassium, or an alkali metal compound such as an alkali metal hydride, an alkali metal hydroxide or an alkali metal carbonate, is added to bisphenols combined together by the electron attracting group for the purpose of converting them into a corresponding alkali metal salt of bisphenol. This addition is made in a polar solvent with a high dielectric constant, such as N-methyl-2-pyrrolidone, N,N-dimethylacetamide, sulfolane, diphenyl sulfone or dimethyl sulfoxide.

The alkali metal, etc. can be generally used in rather slight excess based on the hydroxyl groups of the bisphenol, for example usually 1.1 to 2 times equivalent amount, preferably 1.2 to 1.5 times equivalent amount.

Thereafter, the alkali metal salt of bisphenol is reacted with a halogen-substituted, e.g., fluorine- or chlorine-substituted, aromatic dihalide compound which has been activated by electron attracting groups, in the presence of a solvent which can foam an azeotropic mixture with water, such as benzene, toluene, xylene, hexane, cyclohexane, octane, chlorobenzene, dioxane, tetrahydrofuran, anisole or phenetole. Examples of the above aromatic dihalide compound include 4,4'-difluorobenzophenone, 4,4'-dichlorobenzophenone, 4,4'-chlorofluorobenzophenone, bis(4-chlorophenyl)sulfone, bis(4-fluorophenyl)sulfone, 4-fluorophenyl-4'-chlorophenylsulfone, bis(3-nitro-4-chlorophenyl)sulfone, 2,6-dichlorobenzonitrile, 2,6-difluorobenzonitrile, hexafluorobenzene, decafluorobiphenyl, 2,5-difluorobenzophenone and 1,3-bis(4-chlorobenzoyl)benzene. From the viewpoint of reactivity, the aromatic dihalide compound is desirably a fluorine compound. But taking the subsequent aromatic coupling reaction into account, the aromatic nucleophilic substitution reaction should be designed to occur so as to yield a molecule terminated with a chlorine atom at its end(s). The active aromatic dihalide compound may be used in an amount 2 to 4 molar times, preferably 2.2 to 2.8 molar times the amount of the bisphenol. The reaction temperature is in the range of 60 to 300° C., preferably 80 to 250° C. The reaction time is in the range of 15 minutes to 100 hours, preferably 1 to 24 hours. Optimally, the active aromatic dihalide compound is a chlorofluoro compound as shown in the hereinafter formulae that has two halogen atoms different in reactivity each other. The use of this compound is advantageous in that the fluorine atom will preferentially undergo the nucleophilic substitution reaction with phenoxide so that the objective chlorine-terminated active compound may be obtained.

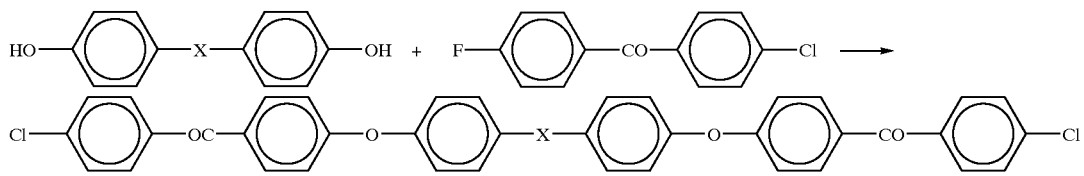

wherein X is as defined in the formula (A).

Other exemplary methods include JP-A-2(1990)/159, in which the nucleophilic substitution reaction is carried out combined with an electrophilic substitution reaction to synthesize the objective flexible compound comprising the electron attracting and electron donating groups.

Specifically, the aromatic bis-halide activated by the electron attracting group, such as bis (4-chlorophenyl) sulfone, is subjected to the nucleophilic substitution reaction with phenol, and the resulting bis-phenoxy substituted compound is subjected to Friedel-Crafts reaction with, for example, 4-chlorobenzoyl chloride to obtain the objective compound. Any of the above-exemplified compounds can be used as the aromatic bis-halide activated by the electron attracting group. The phenol compound may be substituted, but is preferably unsubstituted from the viewpoints of heat resistance and flexibility. When substituted, the substituted phenol compound is preferably an alkali metal salt. Any of the alkali metal compounds listed above can be used for the substitution reaction. The alkali metal compound is used in an amount 1.2 to 2 molar times the amount of the phenol. In the reaction, the aforesaid polar solvent or the azeotropic solvent with water can be employed. To obtain the objective compound, the bis-phenoxy compound is reacted with chlorobenzoyl chloride, as an acylating agent, in the presence of an activator for the Friedel-Crafts reaction, e.g., Lewis acid such as aluminum chloride, boron trifluoride or zinc chloride. The chlorobenzoyl chloride is used in an amount 2 to 4 molar times, preferably 2.2 to 3 molar times the amount of the bis-phenoxy compound. The Friedel-Crafts reaction activator is used in 1.1 to 2 times equivalent amount based on 1 mol of the active halide compound, such as an acylating agent chlorobenzoic acid. The reaction time is in the range of 15 minutes to 10 hours, and the reaction temperature is in the range of −20 to 80° C. As a solvent, chlorobenzene, nitrobenzene or the like that is inactive in the Friedel-crafts reaction may be used.

The monomer (A) in which n is 2 or more may be synthesized through the polymerization also in accordance with the above-mentioned method. In this case, an alkali metal salt of bisphenol in which bisphenol supplies ether oxygen as the electron donating group Y and is combined with the electron attracting group X of >C=O, —SO$_2$— and/or >C(CF$_3$)$_2$, such as 2,2-bis(4-hydroxyphenyl)-1,1,1,3,3,3-hexafluoropropane, 2,2-bis(4-hydroxyphenyl)ketone or 2,2-bis(4-hydroxyphenyl) sulfone, is subjected to a substitution reaction with an excess of the activated aromatic halogen compound such as 4,4'-dichlorobenzophenone or bis (4-chlorophenyl) sulfone, in the presence of a polar solvent such as N-methyl-2-pyrrolidone, N,N-dimethylacetamide or sulfolane.

Examples of such monomers (A) include compounds represented by the following formulae:

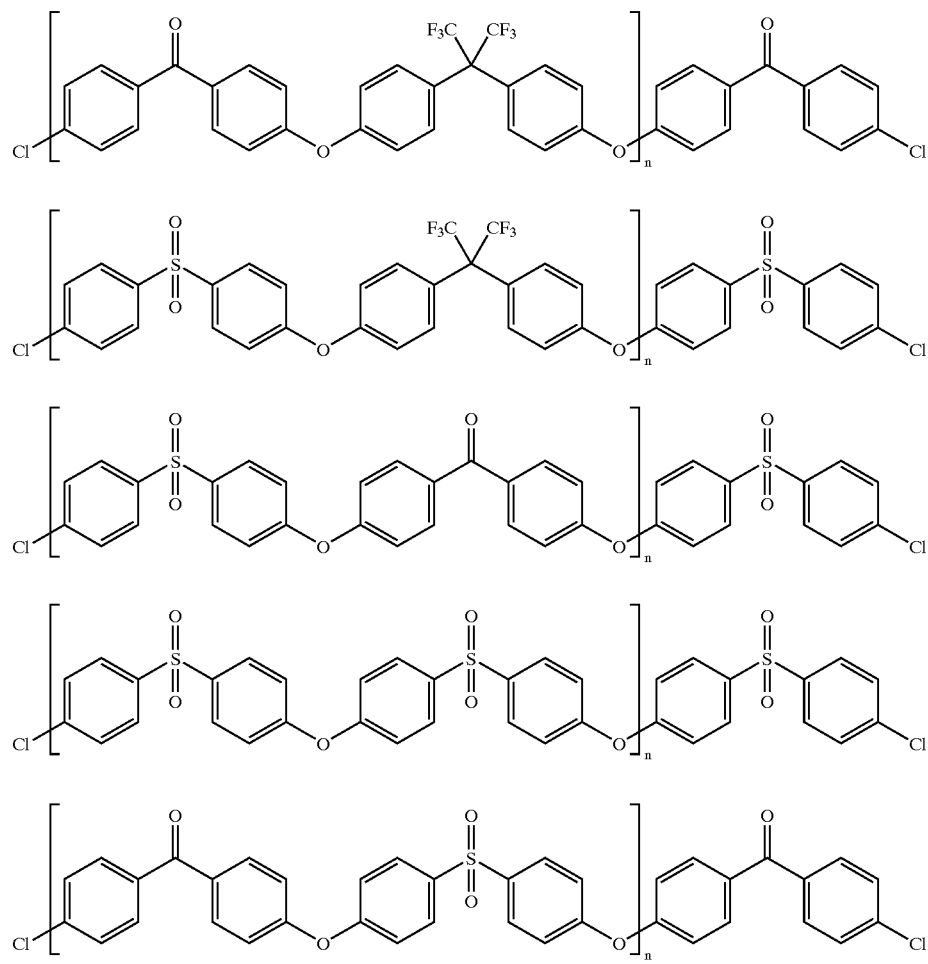

-continued

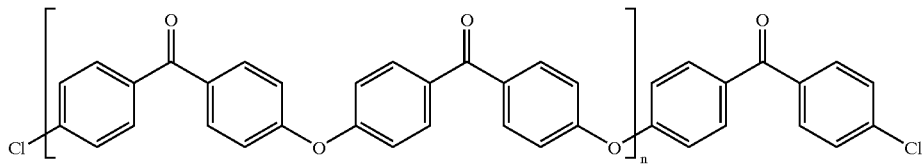

10

In the above formulae, n is not less than 2, preferably from 2 to 100.

Next, the monomers represented by the formulae (B-1) to (B-4) are described.

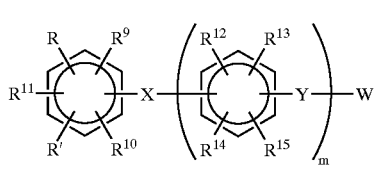
(B-1)

In the above formula, R and R', which may be the same or different, denote the same groups as defined in the formula (A).

$R^9$ to $R^{15}$, which may be the same or different, are independently at least one atom or group selected from a hydrogen atom, a fluorine atom and an alkyl group.

Examples of the alkyl groups indicated by $R^9$ to $R^{15}$ include the same alkyl groups as indicated by $R^1$ to $R^8$ in the formula (A).

m is 0, 1 or 2.

X is a divalent electron attracting group selected from the same groups as defined for X in the formula (A).

Y is a divalent electron donating group selected from the same groups as defined for Y in the formula (A).

W is at least one group selected from the group consisting of a phenyl group, a naphthyl group and groups represented by the following formulae (C-1) to (C-3):

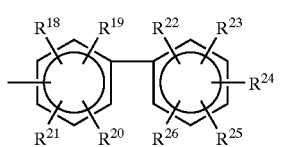
(C-1)

(C-2)

(C-3)

In the above formulae, A denotes an electron donating group or a single bond.

The electron donating group is a divalent electron donating group selected from the same groups as defined for Y in the formula (A).

$R^{16}$ and $R^{17}$ are independently an atom or a group selected from the group consisting of a hydrogen atom, an alkyl group and an aryl group. Examples of the alkyl and aryl groups designated by $R^{16}$ and $R^{17}$ include the same alkyl and aryl groups as indicated by $R^1$ to $R^8$ in the formula (A)

$R^{18}$ to $R^{26}$, which may be the same or different, are independently at least one atom or group selected from a hydrogen atom, a fluorine atom and an alkyl group. Examples of the alkyl groups designated by $R^{18}$ to $R^{26}$ include the same alkyl groups as indicated by $R^1$ to $R^8$ in the formula (A).

q is 0 or 1.

Examples of the monomers of the formula (B-1) include compounds represented by the following formulae:

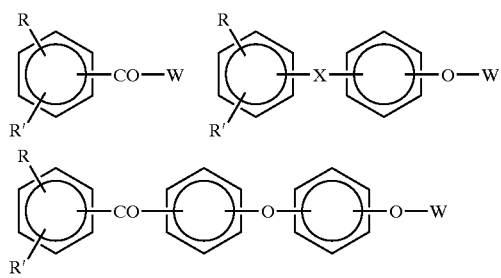

More specifically, the compounds of the formula (B-1) can be exemplified with the following compounds:

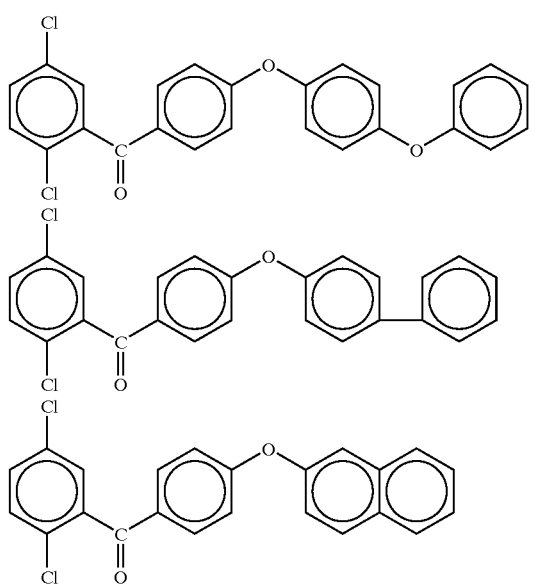

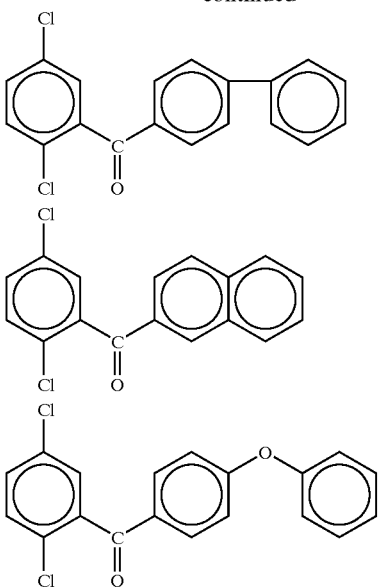

Further, corresponding compounds to the above compounds except that the chlorine atom is replaced with a bromine or an iodine atom are also available.

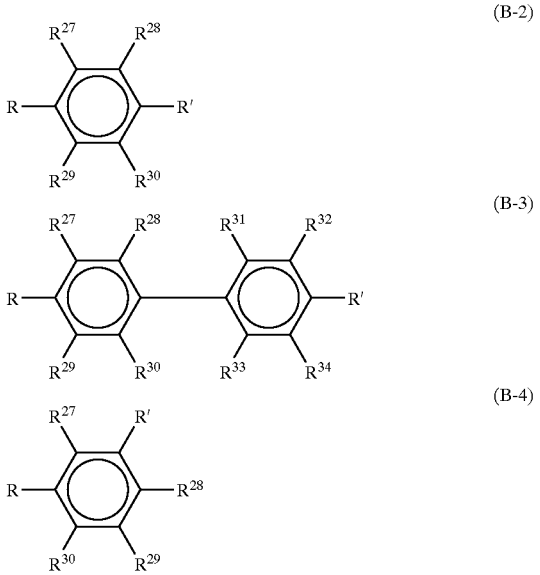

In the formulae (B-2) to (B-4), R and R' may be the same or different and denote the same groups as defined in the formula (A).

$R^{27}$ to $R^{34}$, which may be the same or different, are independently a hydrogen atom, a fluorine atom, an alkyl group, a fluorine-substituted alkyl group, an aryl group or a group represented by the following formula (D):

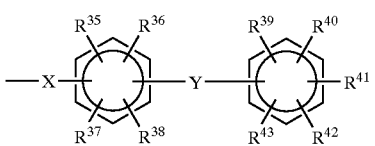

wherein $R^{35}$ to $R^{43}$, which may be the same or different, are independently a hydrogen atom, a halogen atom, an alkyl group or a fluorine-substituted alkyl group.

Examples of the alkyl and fluorine-substituted alkyl groups designated by $R^{27}$ to $R^{34}$ and $R^{35}$ to $R^{43}$ include the same alkyl and fluorine-substituted alkyl groups as indicated by $R^1$ to $R^8$. Examples of the aryl groups designated by $R^{27}$ to $R^{34}$ include the same aryl groups as indicated by $R^1$ to $R^8$.

X is a divalent electron attracting group selected from the same groups as defined for X in the formula (A).

Y is a divalent electron donating group selected from the same groups as defined for Y in the formula (A).

Examples of the monomers represented by the formula (B-2) include p-dichlorobenzene, p-dimethylsulfonyloxybenzene, 2,5-dichlorotoluene, 2,5-dimethylsulfonyloxybenzene, 2,5-dichloro-p-xylene, 2,5-dichlorobenzotrifluoride, 1,4-dichloro-2,3,5,6-tetrafluorobenzene, and corresponding compounds to the above compounds except that the chlorine atom is replaced with a bromine or an iodine atom.

Examples of the monomers represented by the formula (B-3) include 4,4'-dimethylsulfonyloxybiphenyl, 4,4'-dimethylsulfonyloxy-3,3'-dipropenylbiphenyl, 4,4'-dibromobiphenyl, 4,4'-diiodobiphenyl, 4,4'-dimethylsulfonyloxy-3,3'-dimethylbiphenyl, 4,4'-dimethylsulfonyloxy-3,3'-difluorobiphenyl, 4,4'-dimethylsulfonyloxy-3,3',5,5'-tetrafluorobiphenyl, 4,4'-dibromooctafluorobiphenyl and 4,4'-dimethylsulfonyloxyoctafluorobiphenyl.

Examples of the monomers represented by the formula (B-4) include m-dichlorobenzene, m-dimethylsulfonyloxybenzene, 2,4-dichlorotoluene, 3,5-dichlorotoluene, 2,6-dichlorotoluene, 3,5-dimethylsulfonyloxytoluene, 2,6-dimethylsulfonyloxytoluene, 2,4-dichlorobenzotrifluoride, 3,5-dichlorobenzotrifluoride, 1,3-dibromo-2,4,5,6-tetrafluorobenzene, and corresponding compounds to the above compounds except that the chlorine atom is replaced with a bromine or an iodine atom.

To synthesize the polyarylene, the monomers mentioned above are reacted in the presence of a catalyst. The catalyst used herein is a catalyst system containing a transition metal compound. This catalyst system essentially contains (1) a transition metal salt and a compound which functions as a ligand (referred to as the "ligand component" hereinafter), or a transition metal complex (including a copper salt) to which a ligand(s) has been coordinated, and (2) a reducing agent. A "salt" may be added to increase the polymerization rate.

Examples of the transition metal salt include nickel compounds such as nickel chloride, nickel bromide, nickel iodide and nickel acetylacetonate; palladium compounds such as palladium chloride, palladium bromide and palladium iodide; iron compounds such as iron chloride, iron bromide and iron iodide; and cobalt compounds such as cobalt chloride, cobalt bromide and cobalt iodide. Of these, nickel chloride, nickel bromide, etc. are particularly preferred.

Examples of the ligand component include triphenylphosphine, 2,2'-bipyridine, 1,5-cyclooctadiene and 1,3-bis(diphenylphosphino)propane. Of these, triphenylphosphine and 2,2'-bipyridine are preferred. The ligand components may be used singly or in combination of two or more kinds.

Examples of the transition metal complex with coordinated ligands include nickel chloride-bis(triphenylphosphine), nickel bromide-bis(triphenylphosphine), nickel iodide-bis(triphenylphosphine), nickel nitrate-bis(triphenylphosphine), nickel chloride(2,2'-bipyridine), nickel bromide(2,2'-bipyridine), nickel iodide(2,2'-bipyridine), nickel nitrate(2,2'-bipyridine), bis(1,5-cyclooctadiene)nickel, tetrakis(triphenylphosphine)nickel, tetrakis(triphenylphosphite)nickel and tetrakis(triphenylphosphine)palladium. Of these, nickel chloride-bis(triphenylphosphine) and nickel chloride(2,2'-bipyridine) are preferred.

Examples of the reducing agent employable in the aforesaid catalyst system include iron, zinc, manganese, aluminum, magnesium, sodium, calcium and the like. Of these, zinc, magnesium and manganese are preferable. These reducing agents may be used in a more activated form brought about by contact with an acid, e.g., an organic acid.

Examples of the "salt" employable in the catalyst system include sodium compounds, such as sodium fluoride, sodium chloride, sodium bromide, sodium iodide and sodium sulfate; potassium compounds, such as potassium fluoride, potassium chloride, potassium bromide, potassium iodide and potassium sulfate; and ammonium compounds, such as tetraethylammonium fluoride, tetraethylammonium chloride, tetraethylammonium bromide, tetraethylammonium iodide and tetraethylammonium sulfate. Of these, sodium bromide, sodium iodide, potassium bromide, tetraethylammonium bromide and tetraethylammonium iodide are preferred.

With respect to the proportion of the above components, the transition metal salt or the transition metal complex is used usually in an amount of 0.0001 to 10 mol. preferably 0.01 to 0.5 mol, based on 1 mol of the total monomers. If the amount thereof is less than 0.0001 mol, the polymerization may not proceed sufficiently. Contrary, the amount thereof exceeding 10 mol may result in a lowered molecular weight of the polyarylene.

When the catalyst system contains the transition metal salt and the ligand component, the ligand component is used usually in an amount of 0.1 to 100 mol, preferably 1 to 10 mol, based on 1 mol of the transition metal salt. If the amount thereof is less than 0.1 mol, the catalytic activity may become insufficient. Contrary, the amount thereof exceeding 100 mol may result in a lowered molecular weight of the polyarylene.

The amount of the reducing agent is usually in the range of 0.1 to 100 mol, preferably 1 to 10 mol, based on 1 mol of the total monomers. If the reducing agent is used in an amount less than 0.1 mol, the polymerization may not proceed sufficiently. Contrary, the amount thereof exceeding 100 mol may make the purification of the resulting polyarylene more difficult.

When the "salt" is used, the amount thereof is usually 0.001 to 100 mol, preferably 0.01 to 1 mol, based on 1 mol of the total monomers. If the salt is used in an amount less than 0.001 mol, increasing the polymerization rate often cannot be effected sufficiently. Contrary, the amount thereof exceeding 100 mol may result in difficult purification of the resulting polyarylene.

Exemplary solvents usable in the above polymerization include tetrahydrofuran, cyclohexanone, dimethyl sulfoxide, N,N-dimethylformamide, N,N-dimethylacetamide, N-methyl-2-pyrrolidone, γ-butyrolactone and γ-butyrolactam. Of these, tetrahydrofuran, N,N-dimethylformamide, N,N-dimethylacetamide and N-methyl-2-pyrrolidone are preferred. These polymerization solvents are desirably used after dried sufficiently.

The concentration of the total monomers in the polymerization solvent is usually in the range of 1 to 90 wt %, preferably 5 to 40 wt %.

The polymerization temperature is usually 0 to 200° C., preferably 50 to 120° C., and the polymerization time is usually 0.5 to 100 hours, preferably 1 to 40 hours.

By the polymerization of the monomer (A) of the formula (A) with at least one monomer (B) selected from the monomers of the formulae (B-1) to (B-4) as described above, a polymerization solution containing the polyarylene is thus obtained.

The preferred polyarylene is the compound represented by the following formula (1).

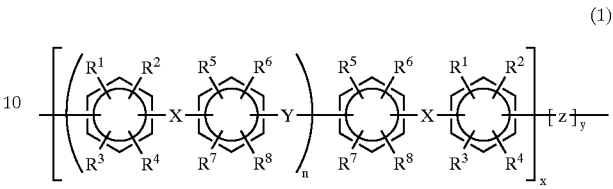

(1)

In the above formula, $R^1$ to $R^8$, X and Y respectively denote the same group as defined in the formula (A). n is defined as in the formula (A). x and y are each an integer of 1 or more. Z is selected from the following formulae, (B-1)' to (B-4)'.

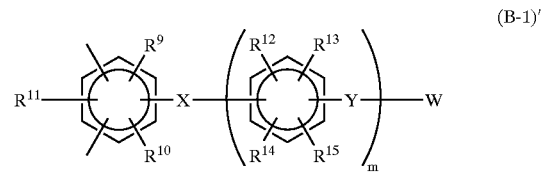

(B-1)'

(B-2)'

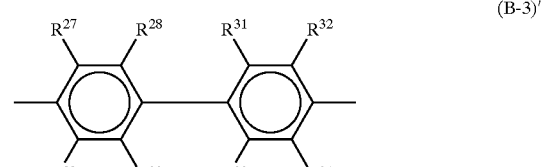

(B-3)'

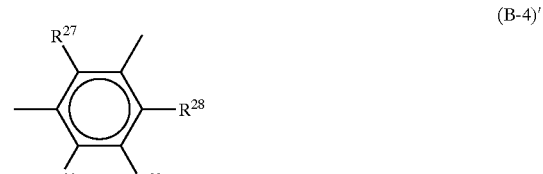

(B-4)'

In the above formulae, $R^9$ to $R^{34}$, X, Y, W and m are respectively defined as in the formulae (B-1) to (B-4).

The sulfonated polyarylene used in the proton conductive membrane of the invention may be obtained by introducing a sulfonic group into the above polyarylene having no sulfonic groups by the conventional technique using a sulfonating agent.

For introduction of a sulfonic group, the polyarylene having no sulfonic groups may be treated with a conventional sulfonating agent, such as sulfuric anhydride, fuming sulfuric acid, chlorosulfonic acid, sulfuric acid or sodium bisulfite, under known conditions (see Polymer Preprints, Japan, vol. 42, No. 3, p. 730 (1993), Polymer Preprints, Japan, vol. 42, No. 3, p. 736 (1994), Polymer Preprints, Japan, vol. 42, No. 7, pp. 2490–2492 (1993)).

Namely, the sulfonation is carried out under such conditions as the polyarylene having no sulfonic groups is reacted with the sulfonating agent in the presence or absence of a solvent. Examples of the solvent include hydrocarbon solvents such as n-hexane; ether-type solvents such as tetrahydrofuran and dioxane; aprotic polar solvents such as dimethylacetamide, dimethylformamide and dimethyl sulfoxide; and halogenated hydrocarbons such as tetrachloroethane, dichloroethane, chloroform and methylene chloride. Although the reaction temperature is not specifically limited, it is usually in the range of −50 to 200° C., preferably −10 to 100° C. The reaction time is usually 0.5 to 1000 hours, preferably 1 to 200 hours.

The sulfonated polyarylene thus obtained will contain the sulfonic group in an amount of 0.5 to 3 mg equivalent/g, preferably 0.8 to 2.8 mg equivalent/g. If the sulfonic group is contained in an amount less than 0.5 mg equivalent/g, the proton conductivity may not be increased. Contrary, when the amount thereof exceeds 3 mg equivalent/g, hydrophilicity is so increased that the resulting polymer becomes water soluble or, if not water soluble, less durable.

The above amount of sulfonic group can be readily controlled by altering the proportion between the monomers (A) and (B) or changing the type or combination of the monomer(s) (B).

The precursor polymer of the sulfonated polyarylene (i.e., polyarylene prior to the sulfonation) has a weight-average molecular weight of 10,000 to 1,000,000, preferably 20,000 to 800,000, in terms of polystyrene.

(Production Process)

To produce the proton conductive membrane of the invention, the proton conductive resin having sulfonic acid ion-exchange groups, e.g., sulfonated polyarylene, is first formed into a film by the conventional method.

Specifically, the proton conductive resin is dissolved in a solvent and the resultant solution is flow-cast on a substrate to form a film, which is called casting, or melt forming.

Examples of the solvent for use in the casting method include aprotic polar solvents, such as dimethylacetamide, dimethylformamide, N-methyl-2-pyrrolidone and dimethyl sulfoxide. The solvent may be further mixed with an alcohol solvent such as methanol.

Then said film is soaked in an aqueous solution of the nitrogen-containing compound until the compensating swelling is attained, and thereafter water is evaporated from the swollen film to yield the proton conductive membrane containing a predetermined amount of the nitrogen-containing compound.

The above aqueous solution contains the nitrogen-containing compound usually in a concentration of 0.1 to 15 wt %, preferably 0.25 to 10 wt %, depending on the soaking time. When the film derived from the proton conductive resin is soaked in the aqueous solution of the nitrogen-containing compound, the temperature of the aqueous solution is chosen to be usually 5 to 70° C., preferably 10 to 50° C.

Thereafter the soaked film is dried at 30 to 100° C., preferably 50 to 80° C. for 10 to 180 minutes, preferably 15 to 60 minutes, and subsequently vacuum dried at 50 to 150° C. and preferably at 500 to 0.1 mmHg for 0.5 to 24 hours, thereby yielding the proton conductive membrane.

The thus-obtained proton conductive membrane will range in dry thickness from usually 10 to 100 μm, preferably 20 to 80 μm.

The proton conductive membrane contains the nitrogen-containing compound in an amount of 0.5 to 10 parts, preferably 1 to 10 parts by weight based on 100 parts by weight of the proton conductive resin. When the content of the nitrogen-containing compound is less than 0.5 part by weight, the heat resistance of the membrane may not be improved as expected. Whereas the content exceeding 10 parts by weight can cause plasticization of the membrane so that it has poor mechanical and heat resistances.

EXAMPLES

The present invention will be hereinafter described in detail by the following Examples, but it should be construed that the invention is in no way limited to those Examples.

(Sulfonated Polyarylene Used in the Embodiments)

The use was made of a sulfonated copolymer (sulfonic acid concentration (hereinafter "IEC")=2.10 meq/g) that had Mn of 50,000 and Mw of 150,000. The copolymer comprised 2,5-dichloro-4'-(4-phenoxy)phenoxybenzophenone and a condensate chlorobenzoyl-terminated at both ends of 4,4'-dichlorobenzophenone and 2,2-bis(4-hydroxyphenyl)-1,1,1,3,3,3-hexafluoropropane (Mn=11,200, Mw=27,500) in 97:3 molar ratio.

(Measurement of Residual NMP Amount)

The proton conductive membrane was dissolved in DMSO-d6, and the DMSO-d6 solution was subjected to 128 times integrating measurement of $^1$H-NMR at room temperature. The NMP amount per 100 parts by weight of the polymer was determined from a ratio of the peak intensity of NMP (N-methylpyrrolidone) to that of polymer.

(Evaluation of Heat Resistance)

A sample film about 40 μm thick was heat treated at 160° C. for 2 hours and thereafter soaked in NMP to separate all the NMP-soluble substances. Then the weight of residual NMP-insoluble matters was measured by a gravimetric method to determine the heat resistance.

In determination of the heat resistance as a mechanical property, the principal-dispersion temperatures (temperatures at which principal dispersion took place) in a temperature dependency of tan δ of dynamic viscoelasticity were used as an indication of the heat resistance.

(Measurement of Proton Conductivity)

A sample membrane with a diameter of 13 mm, which had been placed in an atmosphere of 90% relative humidity, was sandwiched between platinum electrodes and the test specimen was encapsulated in a closed cell. The cell was operated using an impedance analyzer (HYP 4192A) at a frequency of 5 to 13 MHz, an applied voltage of 12 mV and a temperature of 85° C. to measure the absolute value and phase angle of its impedance. The complex impedance at an oscillation level of 12 mV was computed from the above-obtained data to calculate the proton conductivity at 85° C. and 90% RH.

Example 1

(Preparation of Proton Conductive Membrane)

A 15 wt % solution of the sulfonated polyarylene (in a mixed solvent consisting of methanol and NMP in 50:50 volume ratio) was cast to obtain a cast membrane (50 μm thick). The dried membrane still contained NMP in an amount of 10 parts by weight. Then a specimen 10 cm×10 cm was cut out from the dried membrane and soaked in an aqueous solution (5 L) containing 1.5 wt % of NMP for 24 hours at room temperature. Then the film was dried at 150° C. for 30 minutes, and the amount of solvent NMP remaining in the film was measured to be 6.7 parts by weight (in ratio to 100 parts by weight of the sulfonated polyarylene, the same applies hereinafter).

The proton conductivity and the heat resistance were measured for the thus-obtained proton conductive membrane containing 6.7 parts by weight of NMP.

The proton conductive membrane had a proton conductivity of 0.21 s/cm and yielded no insoluble matters on heat treatment. The principal-dispersion temperatures of tan δ of dynamic viscoelasticity were in the range of not lower than 180° C.

Example 2

(Preparation of Proton Conductive Membrane)

A specimen 10 cm×10 cm was cut out from a dried membrane prepared in the same manner as in Example 1, and it was soaked in an aqueous solution (5 L) containing 1.0 wt % of NMP for 24 hours at room temperature. Then the film was dried at 150° C. for 30 minutes, and the amount of solvent NMP remaining in the film was measured to be 5.8 parts by weight.

The proton conductivity and the heat resistance were measured for the thus-obtained proton conductive membrane containing 5.8 parts by weight of NMP.

The proton conductive membrane had a proton conductivity of 0.21 s/cm and yielded no insoluble matters on heat treatment. The principal-dispersion temperatures of tan δ of dynamic viscoelasticity were in the range of not lower than 180° C.

Example 3

(Preparation of Proton Conductive Membrane)

A specimen 10 cm×10 cm was cut out from a dried membrane prepared in the same manner as in Example 1, and it was soaked in an aqueous solution (5 L) containing 0.5 wt % of NMP for 24 hours at room temperature. Then the film was dried at 150° C. for 30 minutes, and the amount of solvent NMP remaining in the film was measured to be 4.2 parts by weight.

The proton conductivity and the heat resistance were measured for the thus-obtained proton conductive membrane containing 4.2 parts by weight of NMP.

The proton conductive membrane had a proton conductivity of 0.21 s/cm and yielded no insoluble matters on heat treatment. The principal-dispersion temperatures of tan δ of dynamic viscoelasticity were in the range of not lower than 180° C.

Comparative Example 1

(Preparation of Proton Conductive Membrane)

A specimen 10 cm×10 cm was cut out from a dried membrane prepared in the same manner as in Example 1, and it was soaked in an aqueous solution (5 L) containing 0.1 wt % of NMP for 8 hours at room temperature. Then the film was dried at 150° C. for 30 minutes, and the amount of solvent NMP remaining in the film was measured to be 0.1 part by weight.

The proton conductivity and the heat resistance were measured for the thus-obtained proton conductive membrane containing 0.1 part by weight of NMP.

The proton conductive membrane had a proton conductivity of 0.21 s/cm, and the principal-dispersion temperatures of tan δ of dynamic viscoelasticity were in the range of not lower than 180° C. However, the membrane yielded 11 wt % of insoluble matters on heat treatment.

Comparative Example 2

(Preparation of Proton Conductive Membrane)

A specimen 10 cm×10 cm was cut out from a dried membrane prepared in the same manner as in Example 1, and it was soaked in an aqueous solution (5 L) containing 0.25 wt % of NMP for 8 hours at room temperature. Then the film was dried at 150° C. for 30 minutes, and the amount of solvent NMP remaining in the film was measured to be 1.2 parts by weight.

The proton conductivity and the heat resistance were measured for the thus-obtained proton conductive membrane containing 1.2 parts by weight of NMP.

The proton conductive membrane had a proton conductivity of 0.21 s/cm, and the principal-dispersion temperatures of tan δ of dynamic viscoelasticity were in the range of not lower than 180° C. However, the membrane yielded 9 wt % of insoluble matters on heat treatment.

Comparative Example 3

(Preparation of Proton Conductive Membrane)

A specimen 10 cm×10 cm was cut out from a dried membrane prepared in the same manner as in Example 1, and it was soaked in an aqueous solution (5 L) containing 7 wt % of NMP for 8 hours at room temperature. Then the film was dried at 150° C. for 30 minutes, and the amount of solvent NMP remaining in the film was measured to be 15 parts by weight.

The proton conductivity and the heat resistance were measured for the thus-obtained proton conductive membrane containing 15 parts by weight of NMP.

The proton conductive membrane had a proton conductivity of 0.18 s/cm and yielded no insoluble matters on heat treatment. However, the peak temperature of tan δ of dynamic viscoelasticity was drastically lowered to 150° C.

The proton conductive membrane according to the invention exhibits high proton conductivity and has an excellent heat resistance.

What is claimed is:

1. A proton conductive membrane with a dry thickness of 10 to 100 μm comprising a nitrogen-containing compound which can be mixed with water in arbitrary proportions and has a boiling point of not lower than 100° C. and a proton conductive resin which is a sulfonated polyarylene and has sulfonic acid as ion exchange groups, wherein the nitrogen-containing compound is contained in an amount of 0.5 to 10 parts by weight based on 100 parts by weight of the proton conductive resin.

2. The proton conductive membrane of claim 1, wherein the nitrogen-containing compound is compatibilized with the proton conductive resin.

3. The proton conductive membrane of claim 1, wherein the nitrogen-containing compound is N-methylpyrrolidone, tetramethylurea or dimethylimidazolidinone.

4. A process for producing a proton conductive membrane comprising the steps of
(i) dissolving a proton conductive resin which is a sulfonated polyarylene and has sulfonic acid as ion exchange groups in a solvent,
(ii) flow-casting the resultant solution on a substrate to form a film,
(iii) soaking the formed film in an aqueous solution containing, in a concentration of 0.1 to 15 wt %, a nitrogen-containing compound with a boiling point of not lower than 100° C. and
(iv) drying the soaked film to yield the proton conductive membrane.

* * * * *